United States Patent Office 3,078,181
Patented Feb. 19, 1963

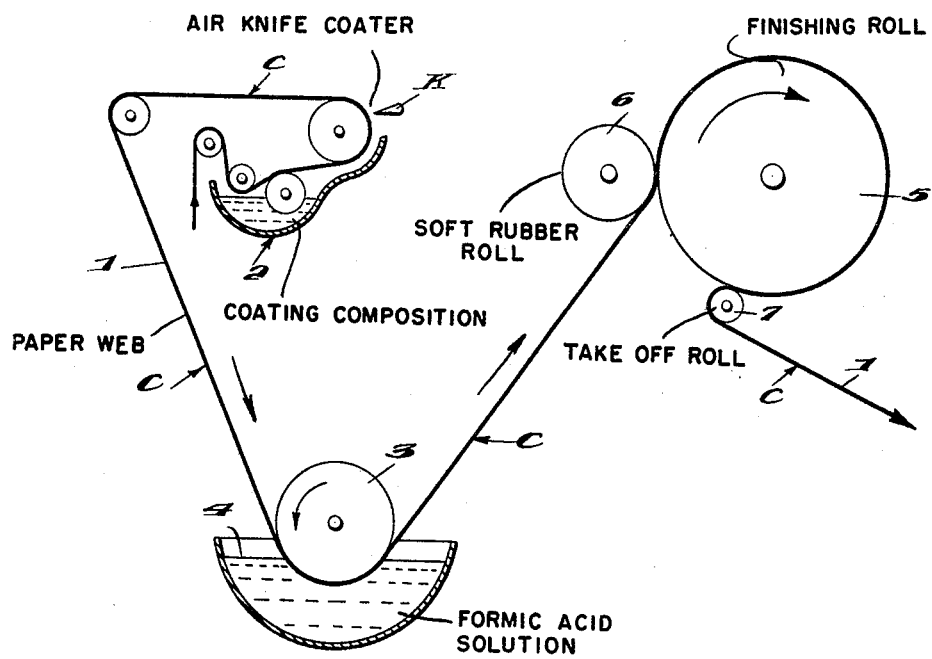

3,078,181
PROCESS FOR THE MANUFACTURE OF COATED PAPER
Robert Thompson Hart, West Falmouth, Maine, assignor to S. D. Warren Company, Boston, Mass., a corporation of Massachusetts
Original application Sept. 18, 1956, Ser. No. 610,466, now Patent No. 2,919,205, dated Dec. 29, 1959. Divided and this application Aug. 4, 1959, Ser. No. 831,532
2 Claims. (Cl. 117—62.2)

This invention relates to coated paper, and more particularly to the gelation of mineral-coated paper employing gelable binders. This application is a division of my copending application Serial No. 610,466, filed September 18, 1956, now U.S. Patent No. 2,919,205, entitled "Process for the Manufacture of Coated Paper."

In the production of coated paper it is often desirable to achieve a high degree of gelation of such coatings while they are still moist and without the permanent presence on said coating of acids or other minerals employed for gelation, and it is a general object of my invention to provide the same.

In the accomplishment of this object in one embodiment, I employ a mineral-filled coating having a gelable binder, such as casein, soy protein, or the like. This coating is applied to a paper base by conventional means and while it is still wet, I gel the same by applying thereto a volatile organic acid, such as formic or acetic acid. Thereafter I dry the paper at a sufficiently high temperature and for a duration of time long enough to evaporate the volatile acid. In this way I am able to gel and insolubilize the binder without the permanent presence in the coating of the gelling and insolubilizing agent. In this instance the acidic agent appears to regenerate the dispersed adhesive into its original water-insoluble or water-nondispersible state. In general, it is an important feature of the process of my invention that it conveniently and rapidly gels the coating without removal of water and without concomitant disadvantages incident to the use of strong mineral acids.

The invention will be further described with reference to the accompanying drawing which diagrammatically illustrates apparatus for carrying out preferred embodiments of my invention.

The drawing is a diagrammatic illustration of apparatus suitable for carrying out the process.

EXAMPLE

Step 1

17.5 units of casein were wetted with a solution of 3.5 units of dicyandiamide in 70 units of water. The wetted casein was mixed with 2 units of 28% ammonia water at 50° C. until the casein was colloidally dispersed.

Step 2

One hundred units of fine-particle coating clay were mixed with the dispersion of step 1, and also with 60 units of water to form a smooth slurry.

Step 3

One unit of sodium aluminate ($NaAlO_2$) was dissolved in 9 units of water and added to the composition of step 2.

Step 4

0.5 unit of a silicone anti-foam agent and 0.5 unit of sodium stearate were dispersed in 6 units of water and added to the mixture of step 3.

Step 5

14.5 units of aqueous synthetic latex containing 7 units of styrene-butadiene copolymer were added to the mixture of step 4 to complete the aqueous coating composition.

Step 6

Referring to the drawing, the coating composition of step 5 was applied by means of an air-knife coater 2 to one side C of a well formed paper web 1 weighing about 65 grams per square meter in quantity of wet coating layer equivalent to 21 grams, dry weight, per square meter. Web 1 was passed under roll 3 and the fresh coating was then wetted with 3% aqueous formic acid solution in bath 4, and then was firmly roll-pressed by soft rubber roll G into contact with a polished chrome-plated finishing surface of the roll 5 at a temperature of 120° C., against which face it was dried to substantial dryness. The coating was resistant to wet-rubbing and had a mirror-like gloss substantially equal to the gloss of the chrome-plated finishing surface.

In this example, the units are units by weight. The linear speed of web 1 was about 200 feet per minute. The period between the coating step and the application of the acid was about 3 seconds, and the period between the acid bath and the nip N was about 3 seconds. The pressure in the nip N was about 400 pounds per linear inch of the width of the web. The height of nip N was about 1.5 inches. The web was removed from the polished finishing roll 7 in less than one-half second after its first contact therewith. It will be understood that the take-off roll 7 may be positioned as desired around the circumference of the roll 5 in order to determine the time of contact of the web with the roll 5, beyond the nip N.

It is noted that the acid bath used was dilute formic acid. Dilute mineral acid is also effective, but when such mineral acid is used the web must be further treated to remove therefrom the excess acid picked up by the web. With organic acids such as formic or acetic acids the excess acid is sufficiently volatile at the drying temperature so that the excess is evaporated from the web during the drying process. Formic acid also has the further advantage of causing insolubilization of protein by an action similar to that of formaldehyde.

While a preferred embodiment of this invention has been disclosed, numerous changes, omissions, additions and substitutions can be made without departing from its scope. The invention is further disclosed in the appended claims.

I claim:

1. In a process wherein a paper is coated with an aqueous mixture of a mineral pigment and an alkaline salt of a proteinaceous binder colloidally dispersed therein, said aqueous mixture being substantially free of multivalent metal ions and the protein thereof being capable of regeneration upon an acidification of said mixture, and the coating is thereafter dried by heating; the improvement comprising treating said coating prior to drying with a solution of a volatile lower organic acid and sharply lowering the pH of the coating thereby regenerating said protein, followed by pressing said coating in forming contact against a finishing surface and then heat drying to expel water and excess volatile lower organic acid therefrom.

2. The process of claim 1 wherein said volatile lower organic acid is formic acid.

References Cited in the file of this patent

UNITED STATES PATENTS

| 1,476,562 | Wright | Dec. 4, 1923 |
| 1,924,890 | Troland | Aug. 29, 1933 |
| 2,073,666 | Wernlund | Mar. 16, 1937 |
| 2,346,812 | Bradner | Apr. 18, 1944 |
| 2,439,108 | Staehle | Apr. 6, 1948 |
| 2,849,334 | Hart | Aug. 26, 1958 |